United States Patent [19]
Burnell

[11] 3,854,516
[45] Dec. 17, 1974

[54] VEHICLE WHEELS

[75] Inventor: Hughie Burnell, West Bromwich, England

[73] Assignee: Archibald Kenrick & Sons Limited, West Brunswick, England

[22] Filed: May 9, 1973

[21] Appl. No.: 358,632

[30] Foreign Application Priority Data
May 12, 1972 Great Britain ............... 22537/72

[52] U.S. Cl. ............... 152/415, 152/313, 152/330
[51] Int. Cl. ............................................ B60c 23/00
[58] Field of Search ............... 152/313, 310–312, 152/415, 151, DIG. 5, 323, 330 R

[56] References Cited
UNITED STATES PATENTS

| | | | |
|---|---|---|---|
| 738,566 | 9/1903 | Nirdlinger | 152/DIG. 5 |
| 1,798,210 | 3/1931 | Laursen | 152/DIG. 5 |
| 2,847,049 | 8/1958 | Blomquist | 152/DIG. 5 |
| 3,112,785 | 12/1963 | Altorfer | 152/313 |

Primary Examiner—M. Henson Wood, Jr.
Assistant Examiner—Richard A. Bertsch

[57] ABSTRACT

A method of filling a tire on a vehicle wheel with polyurethane foam comprises fitting the tire to the rim injecting liquid ingredient materials for the foam through an inlet opening in the rim closing the inlet opening revolving the wheel about a vertical axis to distribute the ingredients around the interior of the tire and when foam begins to escape through an outlet which is diametrically opposite to the inlet opening, closing a shut off valve at said outlet to prevent escape of further foam.

5 Claims, 4 Drawing Figures

PATENTED DEC 17 1974
3,854,516
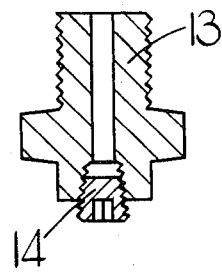
FIG.2.
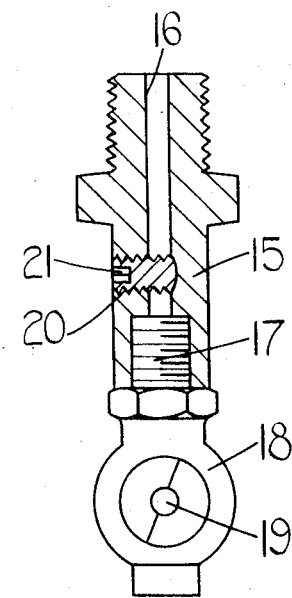
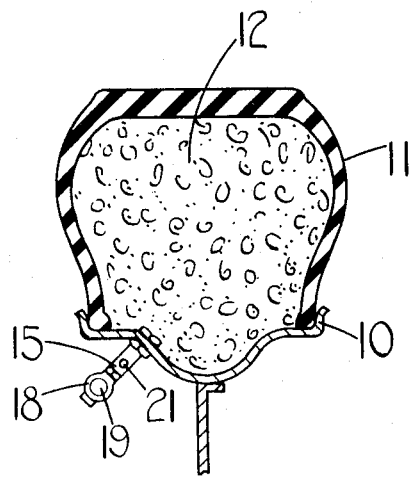
FIG.1.
FIG.3.
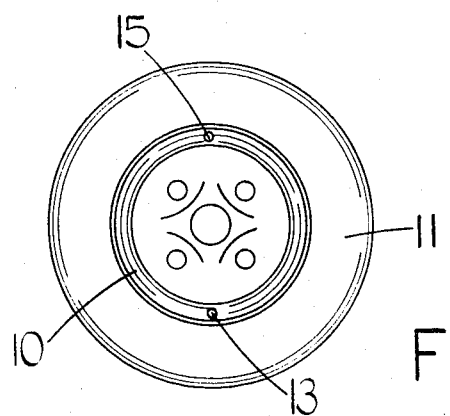
FIG.4.

VEHICLE WHEELS

This invention relates to vehicle wheels comprising a rim to which is fitted a tire, the tire being filled with a foamed material which substantially prevents collapse of the tire in the event that it becomes punctured.

The object of this invention is to provide a method of filling such a wheel with the foamed material, in a convenient and simple manner.

According to the invention a method of filling a tire on a vehicle wheel comprises fitting the tyre to a rim of the wheel, injecting through an inlet opening in the rim, liquid ingredient materials to create a polyurethane foam filling for the interior of the tire, closing said inlet opening, revolving the wheel about a vertical axis to distribute said ingredients around the interior of the tire and when foam begins to escape through an outlet at a position on the rim diametrically opposite the inlet opening, closing a shut off valve at said outlet to prevent escape of further foam.

Conveniently, the valve is a shut off valve at the outlet and is detachably carried in a member containing a pressure bleed valve, the closure of said shut off valve being accomplished before the bleed valve is closed, and finally removing the shut off valve after the bleed valve has been closed.

The invention will now be described by way of example with reference to the accompanying drawings in which FIG. 1 is a part cross-sectional view of an outlet valve assembly for use in a vehicle wheel constructed in accordance with the invention, FIG. 2 is a cross-sectional view of an inlet for the wheel, FIG. 3 is a reduced scale cross-sectional view of a wheel and FIG. 4 is a view of a wheel and tire constructed in accordance with the invention.

The example of the vehicle wheel illustrated comprises a rim 10, on which is fitted a conventional tire 11. The interior of the tire is filled with polyurethane foam indicated at 12.

At one position on the rim, is an inlet opening and at a position diametrically opposite to the inlet opening is an outlet. The inlet opening is defined in an adaptor 13, which is screwed into the rim 10, and is locked by a nut (not shown) within the rim, for closing the inlet opening is a detachable tapered screwed plug 14.

The outlet contains a valve assembly comprising an adaptor 15 secured in the wheel rim in a similar manner to the inlet adaptor 13. This has a central bore 16, terminating at its outer end in a screwed threaded socket 17. Into this is detachably engaged a shut off valve 18, of which the operating member is indicated at 19. In the side of the adaptor 15, moreover, is a screw threaded cross drilling 20, containing a grub screw 21. Both or either of the adaptors 13 and 15 may be made from plastics material such as nylon.

The method of filling the space within the tire with foamed material comprises fitting the tyre onto the rim 10 by known methods, the tire and rim being of normal conventional type. The inlet and outlet adaptors 13 and 15 are mounted on the rim at their respective diametrically opposite positions, the rim having been drilled and tapped for this purpose. The plug 14, of the inlet adaptor is removed and the grub screw 21 is screwed out of the bore 16 in the outlet adaptor 15. Furthermore, the shut off cock 18 is in its open condition.

Next the ingredients for the polyurethane foam, which are in liquid form are injected into the interior of the tire through the inlet adaptor opening. The quantity of such ingredients is calculated to prdouce the required pressure within the tire, to support the load for which the wheel is intended. As soon as the necessary measured quantity of the ingredients has been introduced, the plug 14 is fitted into the adaptor 13 in order to seal the inlet opening.

The wheel is rotated slowly about a vertical axis in order evenly to distribute the liquid ingredients around the interior of the tire. The speed of revolving is not sufficient to create centrifugal forces tending to confine the liquid ingredients to the outer periphery of the space within the tire. Mixing of the ingredients within the tire causes the foam to be produced and when the space within the tire is completely filled with foam, this will begin to issue through the shut off cock 18. The cock also serves to allow the air within the tire to escape. As soon as this occurs, the cock is closed. Further controlled escape at a lower rate can take place through the drilling containing the screw 21.

The pressure bleed valve, which is the screw 21, is next closed. This causes the buildup of pressure in the interior of the tire, this pressure being created by continued expansion of the foam after sealing of both the inlet and the outlet.

The chemical reaction to convert all the injected liquid into foam takes place in a predetermined time and is accomplished at room higher temperature or at a temperature.

I claim:

1. A method of filling a tire on a vehicle wheel comprising fitting the tire to a rim of the wheel, injecting through an inlet opening in the rim, liquid ingredient materials to create a polyurethane foam filling for the interior of the tire, closing said inlet opening, revolving the wheel about a vertical axis to distribute said ingredients around the interior of the tire and when foam begins to escape through an outlet at a position on the rim diametrically opposite the inlet opening, closing a shut off valve at said outlet to prevent escape of further foam.

2. A method as claimed in claim 1 in which the valve is a shut off valve at the outlet and is detachably carried in a member containing a pressure bleed valve, the closure of said shut off valve being accomplished before the bleed valve is closed, and finally removing the shut off valve after the bleed valve has been closed.

3. A method as claimed in claim 1 in which the wheel is rotated at a speed insufficient to create centrifugal force in the liquid ingredients in the tire.

4. A vehicle wheel having a polyurethane foam filling within the tire and having an inlet in the rim through which liquid ingredients for the foam can be injected, and an outlet at a position diametrically opposite to the inlet, the inlet having a closable opening and the outlet having a closable valve including two separate valve elements, one of which is detachably mounted and the other being provided in a body secured to the rim of the wheel.

5. A vehicle wheel as claimed in claim 4, in which the said other valve element is a screw arranged to block a passage formed in the said body.

* * * * *